United States Patent [19]

Jones et al.

[11] 3,810,257

[45] May 7, 1974

[54] ACOUSTIC SURFACE WAVE TRANSDUCER CONFIGURATION FOR REDUCING TRIPLE TRANSIT SIGNALS

[75] Inventors: William Stanley Jones, Bramhall, England; Clinton Sylvester Hartmann, Dallas, Tex.

[73] Assignee: Texas Instruments Incorporated, Dallas, Tex.

[22] Filed: Feb. 1, 1973

[21] Appl. No.: 328,568

[52] U.S. Cl. .................... 333/30 R, 310/9.8, 333/72

[51] Int. Cl. ........ H03h 9/26, H03h 9/30, H03h 9/32

[58] Field of Search ............. 333/30 R, 72; 310/8.1, 310/9.7, 9.8

[56] References Cited

UNITED STATES PATENTS 3,596,211 7/1971 Dias et al. ............................ 333/72

3,626,309 12/1971 Knowles ....................... 333/30 R X

*Primary Examiner*—Archie R. Borchelt

*Assistant Examiner*—Marvin Nussbaum

*Attorney, Agent, or Firm*—Harold Levine; Andrew M. Hassell; William E. Hiller

[57] ABSTRACT

An acoustic surface wave transducer configuration characterized by substantial elimination of triple transit reflection output signal related components is provided. The configuration includes two parallel acoustic channels on a suitable substrate. First and second output transducers are defined respectively in the channels, and are off set by one sixth of an acoustic wavelength. The main signal is substantially unaffected whereas triple transit signals are 180° out of phase and electrically cancel.

11 Claims, 8 Drawing Figures

ACOUSTIC SURFACE WAVE TRANSDUCER CONFIGURATION FOR REDUCING TRIPLE TRANSIT SIGNALS

This invention pertains generally to acoustic surface wave devices and more particularly to interdigitated surface wave transducer configurations characterized by reduced triple transit reflections.

The surface acoustic wave technology is ideally suited for applications in a wide range of passive and active signal processing systems — delay lines, matched terminations, attenuators, phase shifters, bandpass filters, pulse compression filters, matched filters, amplifiers, oscillators, mixers, and limiters, due to the ability to tap, guide, amplify and otherwise manipulate an acoustic wave as it propagates along the surface of a suitable substrate. Such devices utilize acoustic waves which propagate along a stress free plane surface of an isotropic elastic solid. These acoustic surface waves have an essentially exponential decay of amplitude into the solid and therefore most of the particle displacement of the solid occurs within about one wavelength of the surface. For ease in coupling electrically to the surface waves, piezoelectric anisotropic substrates have generally been used. For such piezoelectric substrates coupling a signal to the surface wave can be accomplished by means of deposited interdigitated metal electrodes spaced apart by one-half wavelength at the resonance frequency desired.

Commercial utilization of acoustic surface wave devices has been impaired in many applications because of reflection of a portion of an acoustic beam from the acoustic port of a transducer. That is, a signal is applied to an input transducer to generate an acoustic surface wave at the surface of a suitable substrate. The acoustic surface wave propagates to an output transducer during time $t$ and generates an output signal. A portion of the beam, however, is reflected from the output transducer back toward the input transducer. After an additional propagation time of $t$ a portion of this reflected signal is in turn reflected from the input transducer back toward the output transducer. At time 3t the reflected portion of the original input signal generates a corresponding output signal. This undesired signal is characterized in the art as "triple transit output."

As will be explained later in greater detail, if the reflected signal from each transducer is −NdB down from the incident acoustic wave, then the relative triple transit suppression will be −2NdB with respect to the main output signal.

Two mechanisms exist which contribute to reflected signals from interdigital transducers. First, the presence of the transducer electrodes causes an acoustic and electric discontinuity in the surface wave propagation path which gives rise to reflected signals at the electrode edges. Secondly, any output voltage which is generated by the incident signal will cause "regeneration" of acoustic waves because the voltage appears on all the transducer electrodes. One-half of the regenerated waves travel away from the transducer in the direction of the incident wave and hence appears as a reflected signal.

Accordingly, an object of the invention is the provision of an acoustic surface wave transducer configuration characterized by an output substantially unaffected by triple transit reflections.

A further object of the invention is an acoustic surface wave transducer configuration having two parallel acoustic channels for simultaneously propagating acoustic surface waves corresponding to an input signal, the output transducer in one channel being spaced from the input transducer by a distance which is different than the distance the output transducer in the other channel is spaced from the input transducer, the difference being one-sixth of an acoustic wavelength.

Briefly, in accordance with the invention, an acoustic surface wave transducer configuration characterized by an output which is substantially unaffected by triple transit reflections is provided. The transducer configuration includes means for simultaneously generating acoustic surface waves responsive to an input signal in two parallel acoustic channels. Two separate output transducers are provided, one in each channel. One output transducer is spaced one-sixth of an acoustic wavelength further from the input transducer than the other. The output signal is taken across the two output transducers. The signal components of the main signal detected by the respective output transducers are displaced in time by one-sixth of a wavelength and only slight signal reduction is produced. With respect to triple transit reflections, however, the signal components detected by the respective output transducers are displaced in time, i.e., out of phase, by 180°; that is $3 \times 1/6$. Accordingly, the output signal portions generated by the triple transit reflections substantially cancel out resulting in an output signal which is substantially independent of triple transit components.

Other objects, advantages and uses of the invention will be apparent upon reading the following detailed description of illustrative embodiments in conjunction with the drawings wherein.

Figure 3:
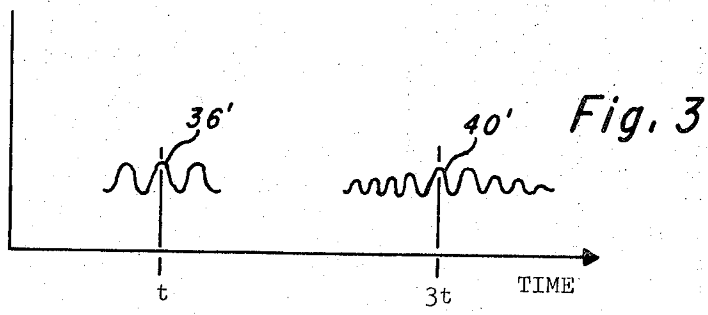
Figure 4:
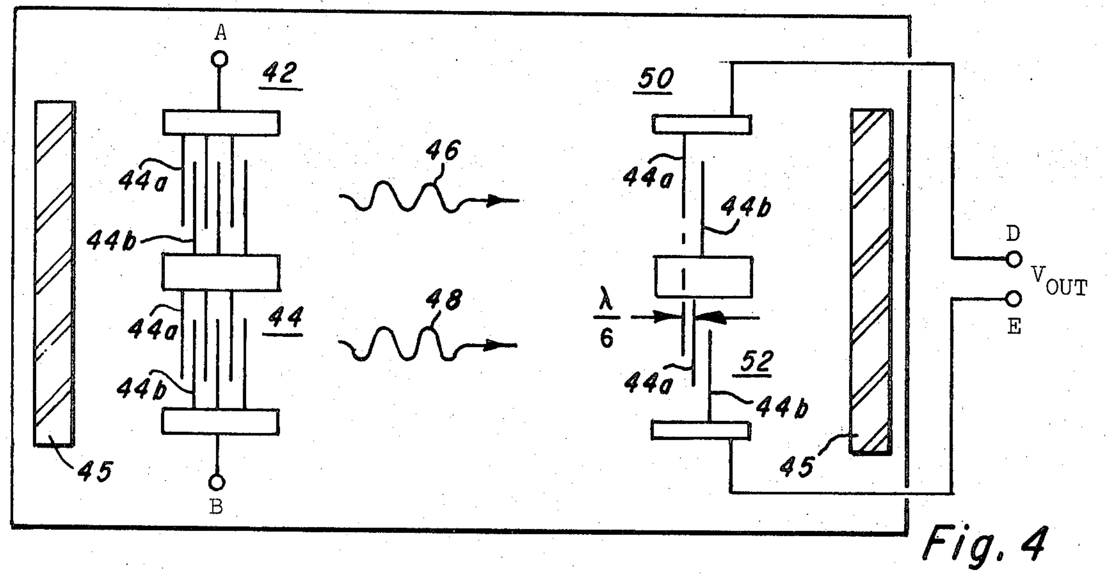
Figure 5:
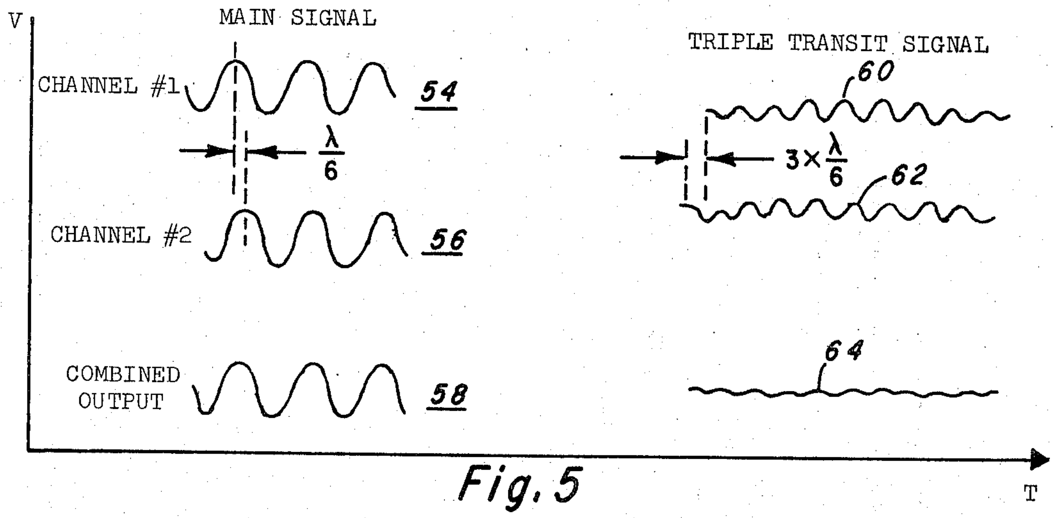
Figure 6:
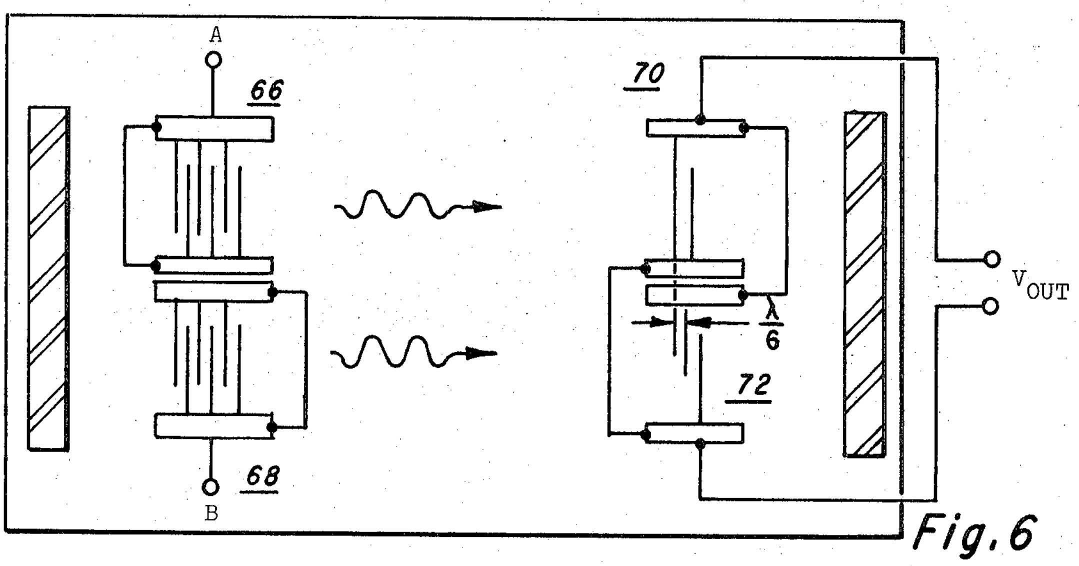
Figure 7:
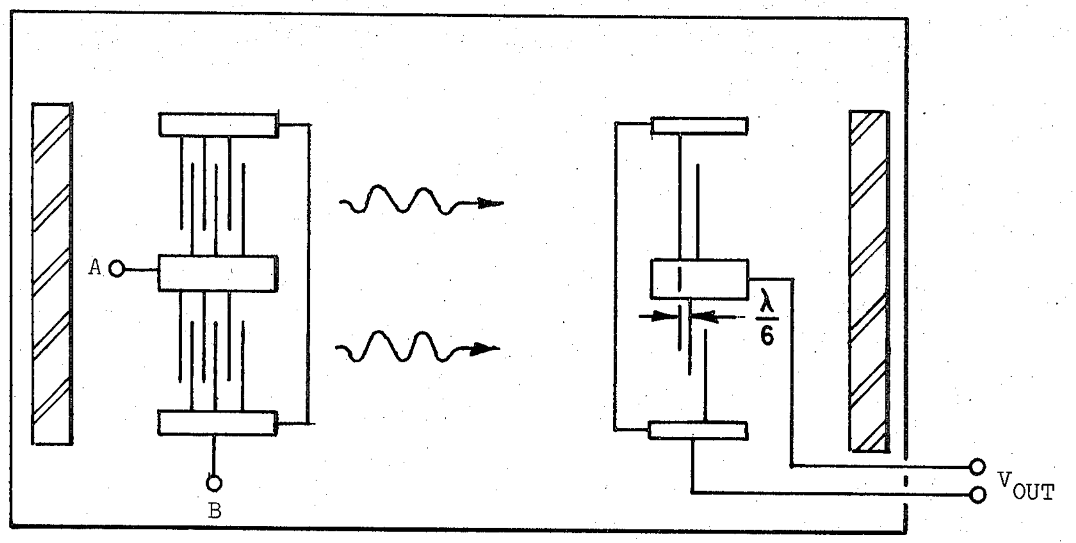
Figure 8:
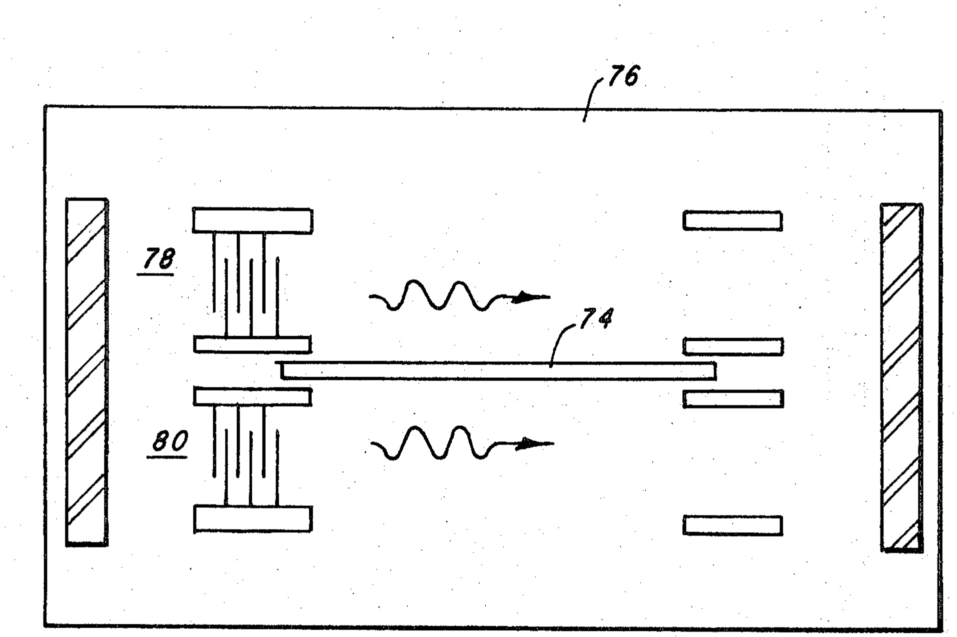

FIG. 3 graphically illustrates the affect of triple transit reflections on the output signal waveform generated by a three cycle input transducer and a signal electrode pair output transducer;

FIG. 4 is a plan view diagrammatically illustrating a preferred embodiment of the transducer configuration of the present invention;

FIG. 5 illustrates typical waveforms generated by the configuration of FIG. 4;

FIGS. 6 and 7 illustrate parallel connection configurations of the transducers in accordance with alternative embodiments of the invention; and FIG. 8 is a plan view illustrating a suitable technique for physically isolating two parallel acoustic channels on a common substrate.

Figure 1:
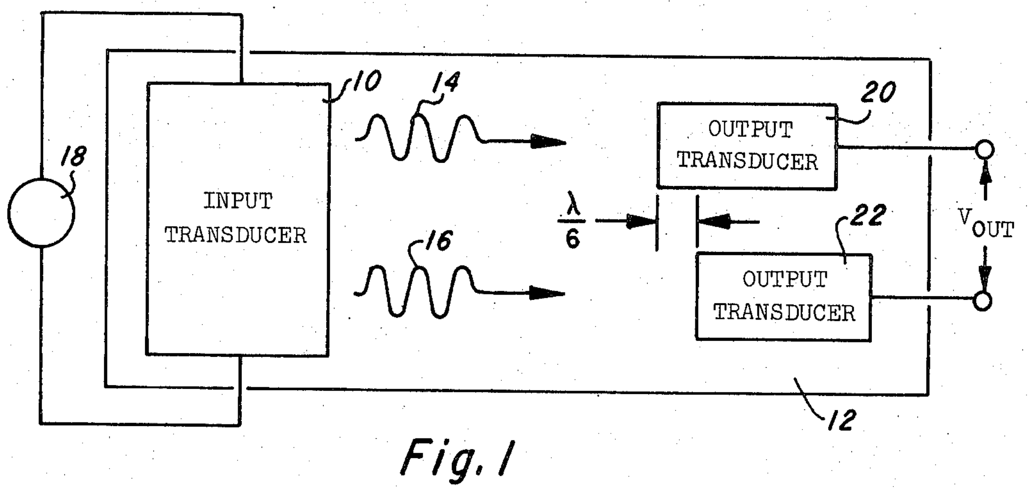
FIG. 1 is a block diagram implementation of the present invention.

With reference now to the drawings, the basic transducer configuration in accordance with the invention is shown in block diagram in FIG. 1. Input transducer means 10 are defined on a suitable substrate 12 to define two parallel acoustic channels, denoted generally by the waves 14 and 16. In response to an input signal from the signal source 18, the two acoustic surface waves 14 and 16 are simultaneously generated in the substrate 12. Suitable substrates for propagating acoustic surface waves are well known in the art and include, by way of example, fused quartz, lithium niobate, and PZT. Preferably, the substrate 12 is a piezoelectric material, in which case transducers comprising interdigitated electrodes of, e.g., aluminum or gold may be utilized to generate the acoustic surface waves and to subsequently detect the waves as they propagate along the substrate. Such transducers are also well known in the art.

In accordance with the invention a pair of output transducers 20 and 22 are defined on the substrate 12 respectively in the acoustic channels defined by waves 14 and 16. The output transducers are effective to produce signals corresponding to the substrate surface displacement resulting from the propagating surface wave. for the situation wherein the substrate 12 is piezoelectric, transducers 20 and 22 are preferably interdigital transducers. When a non piezoelectric substrate such as silicon is used, transducers 20 and 22 may advantageously comprise field effect transistors, as described, e.g., in U.S. Pat. No. 3,609,252.

Output transducers 20 and 22 are spaced from the input transducer 10 by a preselected distance determined by device requirements. One of the output transducers, however, is spaced farther away from the input transducer than the other by one-sixth of an accoustic surface wave at the resonant frequency of the transducer configuration. As shown in FIG. 1, transducer 22 is spaced farther from input transducer 10 than output transducer 20 by one-sixth of a wavelength. As will be described in more detail below, the transducer configuration shown in FIG. 1 is effective to substantially cancel output signals produced by triple transit reflections.

Figure 2:
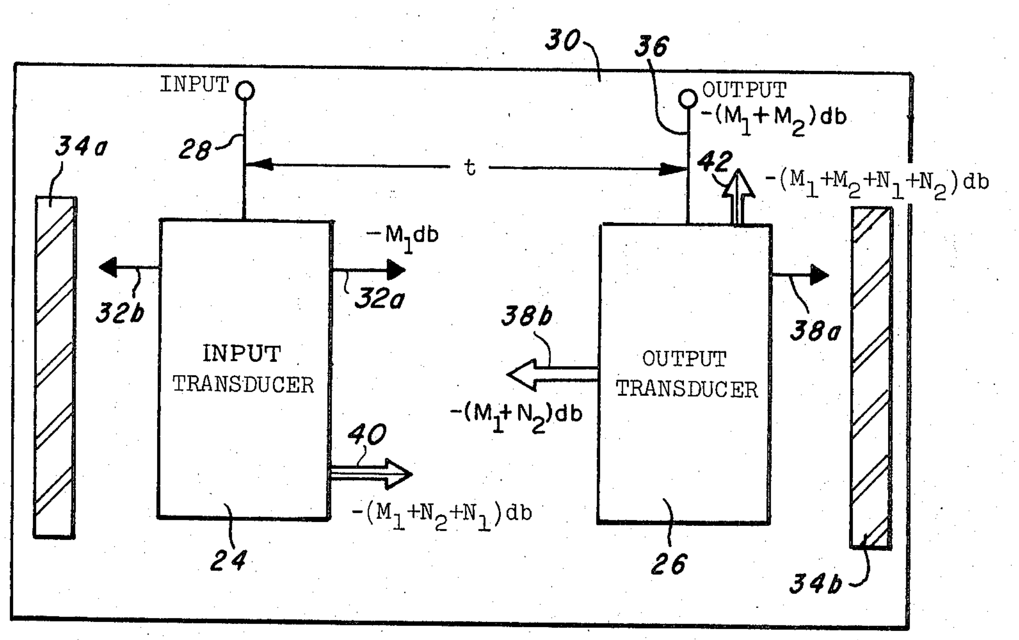
FIG. 2 is a diagrammatical illustration of the affect in the output signal of triple transit reflections characteristic of conventional transducer configurations.

With reference now to FIGS. 2 and 3, the origin and affects of triple transit reflections will be more apparent. In FIG. 2 there is shown in block diagram a pair of linear transducers 24 and 26. An input signal 28 is applied to the input transducer 24 and has a reference energy level of 0 db. Transducer 24 generates an acoustic surface wave in the substrate 30. Due to electric mismatch and bidirectionality loss, these signals are down $M_1$ db from the level of the input signal 28. The surface wave generated by transducer 24 propagates in the directions as shown by arrows **32*a* and 32*b*. An acoustic surface wave absorber 34*a* is defined on the substrate to preclude reflection of the signal 32b from the edge of the substrate 30** back toward the input transducer. Such reflection would of course cause distortion. Acoustic absorbers are also known in the art.

The signal 32a propagates to the output detector 26 and an output signal 36 is generated at time *t*. The signal is down $M_1+M_2$ db from the input where $M_2$ is the insertion loss of transducer 26. The output signal 36 corresponding to a three cycle input transducer 24 and a single electrode pair output transducer 26, produced responsive to an impulse input, is shown in FIG. 3 at 36′.

A portion **38*a* of the signal 32*a* continues propagating along the substrate and is absorbed at 34*b*. Portion 38*b* is reflected from transducer 26** and propagates during time *t* back to the input transducer 24. In other words, this portion of the signal traverses the region between transducer 24 and 26 twice, which is connoted by the double shafted arrow at **38*b*. The signal 38*b* is down $M_1+N_2$ db from the input where $N_2$ is the acoustic reflection coefficient of transducer 26**.

A portion of signal **38*b* is reflected by transducer 24; this portion is diagrammatically illustrated by the triple shafted arrow 40. The portion 40 is down $M_1+N_2+N_1$ db from the input signal where $N_1$ is the reflection coefficient of transducer 24. Signal 40 traverses the region between transducers 24 and 26 a third time and produces an output 42 which is down $M_1+M_2+N_1+N_2$ db from the input. This output is characterized as a triple transit signal. The relative level of this signal is $N_1+N_2$ db down from the main output 36. In FIG. 3 this signal is shown at time 3t as 40′**.

It will be appreciated that output signals at time 6t, 9t, . . . etc. will be produced as a result of reflected waves. However, the signal at **6*t* is down $M_1+M_2+2N_1+2N_2$ db while that at 9*t*** is down $M_1+M_2+3N_1+3N_2$ db; as a practical matter, these signals are sufficiently weak to not adversely affect device operation.

With reference to FIG. 4 a preferred embodiment of the transducer configuration in accordance with the invention is depicted. In this configuration two interdigital input transducers 42 and 44 are electrically connected in series. The input signal is impressed across terminals A and B. Adjacent electrodes such as **44*a* and 44*b*** are spaced apart by a distance corresponding to one-half an acoustic wavelength at the desired resonant frequency.

Transducer 42 is effective to generate an acoustic surface wave, diagrammatically shown at 46, in a first acoustic channel. Transducer 44 generates a second acoustic wave 48 in a second acoustic channel which is parallel to the first channel. As can be seen, the acoustic waves 46 and 48 are generated simultaneously.

Two interdigital output transducer 50 and 52 are defined respectively in the acoustic channels in which waves 46 and 48 propagate. As shown, transducer 52 is laterally off set from transducer 50 by one-sixth of a wavelength at the resonant frequency. Thus, wave 48 travels one-sixth of a wavelength farther prior to detection than wave 46. Hence, the output signals generated by transducers 50 and 52 are out of phase by one-sixth of a wavelength. Output transducers 50 and 52 are connected electrically in series and the output is taken thereacross. Acoustic absorbers 45 are utilized to eliminate the undesired surface wave components produced by the bidirectional transducers.

Operation of a transducer configuration such as shown in FIG. 4 will be more apparent with reference to FIG. 5. Responsive to an impulse signal across terminals A and B, an output signal 54 at time *t* is generated by transducer 50. Similarly, an output signal 56 displaced in time by one-sixth of a wavelength is produced by transducer 52. The output signal 58 across terminals D and E (FIG. 4) is only slightly distorted from that of the main signals 54 and 56 in the individual channels. The triple transit produced signals corresponding to transducer 50 are shown generally at 60 while those corresponding to transducer 52 are shown at 62. It will be noted that the signals 60 and 62 are displaced in time $3 \times 1/6$ or 180°. Therefore, they substantially cancel out, as shown at 64, leaving a main output signal substantially free from triple transit affects.

With reference to FIGS. 6 and 7 alternate electrical connection configurations are illustrated. In FIG. 6 the input transducers 66 and 68 are connected in parallel as are the output transducers 70 and 72. In FIG. 7 a different parallel electrical connection technique is shown. Operation of the transducer configuration are similar to that described with respect to FIG. 3. The parallel configurations of FIGS. 6 and 7 are generally effective only for eliminating triple transit due to reflections at electrode edges.

In some situations it may be desirable to physically separate the two acoustic channels to ensure minimal cross-talk. One suitable technique is shown in FIG. 8 wherein a groove 74 is defined in the substrate 76 between the two acoustic channels. Two separate input transducers 78 and 80 may be desirable. Alternately, one input transducer extending across both channels could be used, the groove 74 effectively defining the two parallel acoustic channels. Other suitable techniques for physically isolating the two channels could of course be used.

While the present invention has been described with respect to linear unweighted transducers, it is clear that coded or weighted transducer arrays could be utilized, if desired. Additional changes will be apparent to those skilled in the art without departing from the spirit or scope of the invention.

What is claimed is:

1. An acoustic surface wave transducer configuration having a preselected center frequency comprising:

a substrate suitable for propagating an acoustic surface wave;

input transducer means on said substrate for receiving an input signal and generating, responsive thereto, acoustic surface waves in said substrate in first and second substantially parallel acoustic channels; and first and second output transducers defined respectively in said first and second channels, said first output transducer being spaced from said input transducer means by a first preselected distance and said second output transducer being spaced from said input transducer means by a second preselected distance, the difference between said first and second distances being one-sixth of an acoustic wavelength at said center frequency.

2. An acoustic surface wave transducer configuration as set forth in claim 1 wherein said input transducer means comprises first and second interdigital transducers, said first transducer defining said first acoustic channel and said second transducer defining said second acoustic channel.

3. An acoustic surface wave transducer configuration as set forth in claim 2 wherein said first and second input transducers are electrically connected in series.

4. An acoustic surface wave transducer configuration as set forth in claim 2 wherein said first and second input transducers are electrically connected in parallel.

5. An acoustic surface wave transducer configuration as set forth in claim 1 wherein said substrate defines a groove extending longitudinally between said first and second channels.

6. An acoustic surface wave transducer configuration comprising:

a piezoelectric substrate;

first and second input interdigital transducers having electrode spacings corresponding to a preselected resonant frequency, said input transducers disposed on said substrate to define first and second parallel acoustic channels;

means connected to said input transducers for simultaneously generating acoustic surface waves for propagating in said first and second channels;

a first output interdigital transducer disposed in said first channel for producing a first output signal responsive to an acoustic surface wave propagating therein, said first output transducer laterally spaced a first preselected distance from said first input transducer;

a second output interdigital transducer disposed in said second channel for producing a second output signal responsive to an acoustic surface wave propagating therein, said second output transducer laterally spaced a second preslected distance from said second input transducer, the difference between said first and second preslected distances defining one-sixth of an acoustic wavelength; and output means connected to said first and second output transducers for providing a resultant output signal which is a combination of said first and second output signals, said resultant output signal being substantially free of components produced responsive to triple transit reflections.

7. An acoustic surface wave transducer configuration as set forth in claim 6 wherein said first and second input transducers are electrically connected in series.

8. An acoustic surface wave transducer configuration as set forth in claim 6 wherein said first and second input transducers are electrically connected in parallel.

9. An acoustic surface wave transducer configuration as set forth in claim 6 wherein said substrate defines a groove extending laterally between said first and second channels.

10. An acoustic surface wave transducer configuration as set forth in claim 6 wherein said output means electrically connect said first and second output transducers in series.

11. An acoustic surface wave transducer configuration as set forth in claim 6 wherein said output means electrically connect said first and second output transducers in parallel.

* * * * *